US012394534B2

(12) United States Patent
Golsharifi et al.

(10) Patent No.: US 12,394,534 B2
(45) Date of Patent: Aug. 19, 2025

(54) NUCLEAR VOLTAIC POWER-SOURCE

(71) Applicant: NDB Inc., San Francisco, CA (US)

(72) Inventors: Nima Golsharifi, London (GB); Suguru Frederick Amakubo, London (GB)

(73) Assignee: NDB Inc., San Francisco, CA (US)

( * ) Notice: Subject to any disclaimer, the term of this patent is extended or adjusted under 35 U.S.C. 154(b) by 76 days.

(21) Appl. No.: 17/926,508

(22) PCT Filed: May 19, 2020

(86) PCT No.: PCT/US2020/033607
§ 371 (c)(1),
(2) Date: Nov. 18, 2022

(87) PCT Pub. No.: WO2021/236067
PCT Pub. Date: Nov. 25, 2021

(65) Prior Publication Data
US 2023/0187094 A1 Jun. 15, 2023

(51) Int. Cl.
*G21H 1/06* (2006.01)
*G21H 1/04* (2006.01)

(52) U.S. Cl.
CPC ................. *G21H 1/06* (2013.01); *G21H 1/04* (2013.01)

(58) Field of Classification Search
None
See application file for complete search history.

(56) References Cited

U.S. PATENT DOCUMENTS

| | | | | |
|---|---|---|---|---|
| 8,866,152 | B2 * | 10/2014 | Lal | G21H 1/06 257/77 |
| 9,530,529 | B2 * | 12/2016 | Choi | G21H 1/06 |
| 11,302,456 | B2 * | 4/2022 | Scott | G21H 1/02 |
| 2014/0125196 | A1 * | 5/2014 | Ma | C08L 65/00 528/8 |
| 2018/0292266 | A1 * | 10/2018 | Slater | G01J 3/4406 |
| 2020/0119207 | A1 * | 4/2020 | Holmes | H01L 31/115 |

FOREIGN PATENT DOCUMENTS

| | | | |
|---|---|---|---|
| CN | 107749316 | A1 | 3/2018 |
| WO | 2018/206958 | A1 | 11/2018 |

OTHER PUBLICATIONS

Blain (Sep. 2020). "Energy Arkenlight 'surprised' by NDB's grand nuclear diamond battery claims View Gallery-5 Images," located at https://newatlas.com/energy/arkenlight-nuclear-diamond-batteries/ visited on Jan. 11, 2021. (21 pages).
Bormashov et al. (Mar. 2018). "High power density nuclear battery prototype based on diamond Schottky diodes," Diamond and Related Materials 84; 15 pages.
(Continued)

*Primary Examiner* — Tamir Ayad
(74) *Attorney, Agent, or Firm* — The Webb Law Firm

(57) ABSTRACT

A diamond-based high power nuclear voltaic power source is described. The device is designed to supply electrical power by converting radiation energy from radioisotopes into electric power. In the process of extracting the electric power, the structure of the power source is used to assist the electric charge out from the diamond compartment of the device at high efficiency and high power.

18 Claims, 7 Drawing Sheets

(56) References Cited

OTHER PUBLICATIONS

International Search Report and Written Opinion mailed Jan. 21, 2021, directed to International Application No. PCT/US2020/033607; 25 pages.

Tabora (Aug. 2020). "The Nano-Diamond Battery (NDB)—Is It Too Good To Be True?", located at https://medium.com/0xmachina/the-nano-diamond-battery-ndb-too-good-to-be-true-548066508c49 visited on Jan. 11, 2021. (5 pages).

* cited by examiner

NUCLEAR VOLTAIC POWER-SOURCE

CROSS REFERENCE TO RELATED APPLICATIONS

This application is a national stage application under 35 U.S.C. § 371 of International Application No. PCT/US2020/033607, filed internationally on May 19, 2020.

FIELD

This disclosure relates generally to nuclear power sources. Specifically, this disclosure relates to diamond-based high power nuclear voltaic power sources.

BACKGROUND

Nuclear voltaic technology was first established in 1913. Nuclear voltaic technology includes nuclear voltaic batteries also known as but not limited to atomic batteries, nuclear batteries, alphavoltaic batteries, and betavoltaic batteries. Nuclear voltaic batteries operate by generating charge using the inelastic scattering of high energy particles such as alpha and beta rays emitted from radioisotopes into a semiconductor. Traditionally speaking, this was typically carried out using semiconductors such as Si and GaAs. However, they were limited to low power due to the narrow bandgap of Si and GaAs (1.12 eV, 1.42 eV for Si and GaAs respectively), resulting in low voltage due to the lower energy level difference and low efficiency due to the shorter carrier lifetime (since there is less time for the charge to be collected before it recombines).

SUMMARY

Recently, there has been a resurgence of nuclear voltaic technology due to the improvement in diamond fabrication technology such as chemical vapor deposition (CVD) technology, high-pressure, high-temperature (HPHT) technology, and detonation. The benefit of using diamond is that the wide bandgap (5.5 eV) can allow for a high voltage (typically up to 2 V), a long carrier lifetime (typically 2000 ns) which can allow it to have a near 100% charge collection efficiency, and an extremely high radiation hardness that allows the device to be used over a significantly long period to time. This is of notable importance since traditional semiconductors such as Si would disintegrate upon exposure to radiation and lose device integrity (a phenomenon known as displacement defect). Furthermore, this often resulted in a limitation where the nuclear voltaic device having a lifetime shorter than what the radioisotope could deliver. Diamond, on the other hand, being an extremely radiation-hard semiconductor can outlast the lifetime of the radioisotope thus able to fully deliver the potential of the device. Thus, diamond nuclear voltaic can power applications for as long as the radioisotopes last.

By choosing the right isotopes, one which has a long enough half-life but short enough to have high activity, nuclear diamond batteries (NDBs) will be able to provide electricity constantly and for longer than a single user's lifetime. The high voltage is of significant interest since most common applications that require a battery such as smartphones (3.7 V), electric vehicle (4.2 V), Internet of Things (IoT, <1.5 V) are all within the comfort zone of being powered by the 2 V generated by diamond nuclear voltaic using electronic voltage optimization. As such, unlike previous generations of nuclear batteries, NDBs are able to power common applications that benefit a substantially wider user base.

Given the theoretical benefits of utilizing diamond nuclear voltaic technology, there have been several very recent attempts to translate the theoretical benefits into a practicable reality. Examples of those are the following references which are hereby incorporated by reference in their entirety:

Liu, B., Dai, B., Liu, K., Yang, L., Zhao, J., Shu, G., Lv, Z., Gao, G., Yao, K., Bi, M. and Xue, J., 2018. Alpha-voltaic battery on diamond Schottky barrier diode. Diamond and Related Materials, 87, pp. 35-42;

Bormashov, V., Troschiev, S., Volkov, A., Tarelkin, S., Korostylev, E., Golovanov, A., Kuznetsov, M., Teteruk, D., Kornilov, N., Terentiev, S. and Buga, S., 2015. Development of nuclear microbattery prototype based on Schottky barrier diamond diodes. physica status solidi (a), 212(11), pp. 25392547;

Langley, J., Litz, M., Russo, J. and Ray Jr, W., 2017. Design of Alpha Voltaic Power Source Using Americium 241 (241Am) and Diamond with a Power Density of 10 mW/cm3 (No. ARL-TR-8189). US Army Research Laboratory Adelphi United States; and Maximenko, S. I., Moore, J. E., Affouda, C. A. and Jenkins, P. P., 2019. Optimal Semiconductors for 3 H and 63 Ni Betavoltaics. Scientific reports, 9(1), pp. 1-8;

Spencer, M. G. and Alam, T., 2019. High power direct energy conversion by nuclear batteries. Applied Physics Reviews, 6(3), p. 031305.

None of the above prior attempts, however, have successfully overcome the four main issues preventing the creation of practical solutions appropriate to market needs. First, none have been able to configure solutions that deliver high enough power for the majority of useful applications. Second, radioisotopes, especially high-power isotopes, are known to produce significant amounts of heat and no suitable strategies for the management of this heat, especially during periods of low usage, have been forthcoming. Third, current devices are forced to choose between high efficiency or high voltage. For example, contact materials with a small work function such as Al has a high charge collection efficiency, but low voltage. On the other hand, large work function materials such as Pt (5.12-5.93 eV) has the opposite issue of low efficiency, but high voltage. Lastly, the current state of the art designs does nothing to address the potential problem that the isotopes contained within the power source could be recovered and misused.

Applicants have discovered an electric power source that is powered by one or more radioisotopes that can solve the problems listed above as well as other issues. Specifically, Applicants have discovered a high-power diamond-based nuclear voltaic device that can power applications that the current state-of-the-art cannot. The diamond-based nuclear voltaic devices disclosed herein can power various applications ranging from smartphones, electric vehicles, Internet of Things (IOTs) as well as many other applications currently powered by battery. As such, the devices disclosed herein can cater to a wide range of consumers in a manner that is safe, high-power versatile power solution that is in line with global efforts towards a clean energy solution.

In some embodiments, a nuclear power source includes at least one radioisotope, at least one diamond-based charge generator, at least one electric contact electrically connected to the at least one diamond-based charge generator, and a radiation shield that encompasses the at least one radioisotope, the at least one diamond-based charge generator, and the at least one electric contact. In some embodiments, the at least one diamond-based charge generator comprises a first diamond layer and a second diamond layer. In some embodiments, the first diamond layer comprises a $P^{+}$-type diamond and the second layer comprises a P-type diamond. In some embodiments, the at least one diamond-based charge generator comprises an ohmic contact layer and a Schottky contact layer. In some embodiments, the ohmic contact layer comprises Ti, Zr, Hf, TiC, ZrC, HfC, Zr—Ti—C, Hf—Ti—C, Zr—Hf—C, Ti—Hf—C, or Ti—Zr—Hf—C and the Schottky contact layer comprises Al, Ti, Ni, Au, Ag, Nb, Cu, Cr, and Pt. In some embodiments, the ohmic contact layer is on a side of the first diamond layer, the second diamond layer is on a side of the first diamond layer opposite the ohmic contact layer, and the Schottky contact layer is on a side of the second diamond layer opposite the first diamond layer. In some embodiments, the at least one diamond-based charge generator comprises at least one insulator layer and an end contact layer. In some embodiments, the at least one insulator layer comprises ZnO, CuO, NiO, $AlO_x$, $SiO_2$, $TiO_2$, NiO, $Nb_2O_5$, $Al_2O_3$, NiO/ZnO, $Cr_2O_3/Al_2O_3$, $HfO_2/TiO_2$, $Al_2O_3/TiO_2$, or $Nb_2O_5/Ta_2O_5$ and the end contact layer comprises Pt, Ni, Pd, Au, Ir, Ta, Ag, Al, Cr, Ti, W, and doped semiconductors. In some embodiments, the at least one insulator layer is on a side of the Schottky contact layer opposite the second diamond layer and the end contact layer is on a side of the at least one insulator layer opposite the Schottky contact layer. In some embodiments, the at least one radioisotope comprises at least one of the following radioisotopes: P-32, V-48, Cf-253, Cr-51, Md-258, Be-7, Cf-254, Co-56, Sc-46, S-35, Tm-168, Fm-257, Tm-170, Po-210, Ca-45, Au-195, Zn-65, Co-57, V-49, Cf-248, Ru-106, Np-235, Cd-109, Tm-171, Cs-134, Na-22, Fe-55, Rh-101, Co-60, Kr-85, H-3, Cf-250, Nb-93 m, Sr-90, Cm-243, Cs-137, Ti-44, U-232, Pu-238, Sm-151, Ni-63, Si-32, Ar-39, Cf-249, Ag-108, Am-241, AmBe, Hg-194, Nb-91, Cf-251, Ho-166m1, Bk-247, Ra-226, Mo-93, Ho-153, Cm-246, C-14, Pu-240, Th-229, Am-243, Cm-244, Cm-245, Cm-250, Nb-94, Pu239, U-233, U-234, Pu-242, Np-237, U-235, U-236, and U-238. In some embodiments, the first diamond layer and the second diamond layer comprise at least one of Single-Crystalline Diamond (SCD), Polycrystalline Diamond (PCDs), Diamond-Like Carbon (DLCs), Nano-Diamonds (NDs), diamondoids, sintered diamond, and amorphous diamond. In some embodiments, the first diamond layer and second diamond layer comprises SCD and/or PCD. In some embodiments, the SCD is at least one of Type IIa SCD or Type IIb SCD. In some embodiments, the at least one diamond-based charge generator is on a side of the at least one radioisotope. In some embodiments, the power source includes a plurality of diamond-based charge generators and a plurality of radioisotopes. In some embodiments, the plurality of diamond-based charge generators and the plurality of radioisotopes are arranged in an alternating sequence. In some embodiments, a first plurality of diamond-based charge generators is stacked on a side of a first radioisotope, a second plurality of diamond-based charge generators is stacked on a side of the first radioisotope opposite the first plurality of diamond-based charge generators, and a second radioisotope is on a side of the stack of second plurality of generators opposite the first radioisotope. In some embodiments, the radiation shield comprises at least one of Single-Crystalline Diamond (SCD), Polycrystalline Diamond (PCDs), Diamond-Like Carbon (DLCs), Nano-Diamonds (NDs), diamondoids, sintered diamond, and amorphous diamond. In some embodiments, the radiation shield comprises PCD or sintered diamond. In some embodiments, the at least one electrical contact comprises Ag, Cu, Au, Al, W, Zn, Pt, Ti, or Ni. In some embodiments, the diamond-based charge generator comprises radioisotopes embedded in diamond. In some embodiments, an interface between the second diamond layer and the Schottky contact comprises a dipole moment possessing functionalization. In some embodiments, the radiation shield comprises a diamond layer and a secondary layer. In some embodiments, the secondary layer is embedded within the diamond layer. In some embodiments, the secondary layer comprises apertures that are covered by a secondary cap layer.

Additional advantages will be readily apparent to those skilled in the art from the following detailed description. The examples and descriptions herein are to be regarded as illustrative in nature and not restrictive.

All publications, including patent documents, scientific articles and databases, referred to in this application are incorporated by reference in their entirety for all purposes to the same extent as if each individual publication were individually incorporated by reference. If a definition set forth herein is contrary to or otherwise inconsistent with a definition set forth in the patents, applications, published applications and other publications that are herein incorporated by reference, the definition set forth herein prevails over the definition that is incorporated herein by reference.

BRIEF DESCRIPTION OF THE DRAWINGS

An exemplary embodiment of the present invention is illustrated by way of example in the accompanying drawings. The drawings show.

In the Figures, like reference numbers correspond to like components unless otherwise stated.

DETAILED DESCRIPTION

Applicants have discovered electric power sources (i.e., devices) that are powered by one or more radioisotopes. These nuclear power sources disclosed herein can be voltaic cells and/or batteries used to power a wide variety of applications. Specifically, the nuclear devices disclosed herein were designed in a manner that can allow for the device to be safe, efficient, high-power, scalable, environmentally friendly, and versatile in shape and size. The nuclear devices disclosed herein can generate power as long as the radioisotope lasts depending on the half-life of the radioisotopes used. As such, the nuclear devices can generate power for as long as or much longer than a typical lifetime of the user. Alternatively, radioisotopes of shorter half-life but of higher radioactivity can be used to increase the power output. The nuclear devices disclosed herein were designed such that they generate electric charge by absorbing the energy from the radiation emitted by the radioisotopes. Notably, the design of the device addresses many of the shortfalls of previous devices of similar nature.

Figure 1:
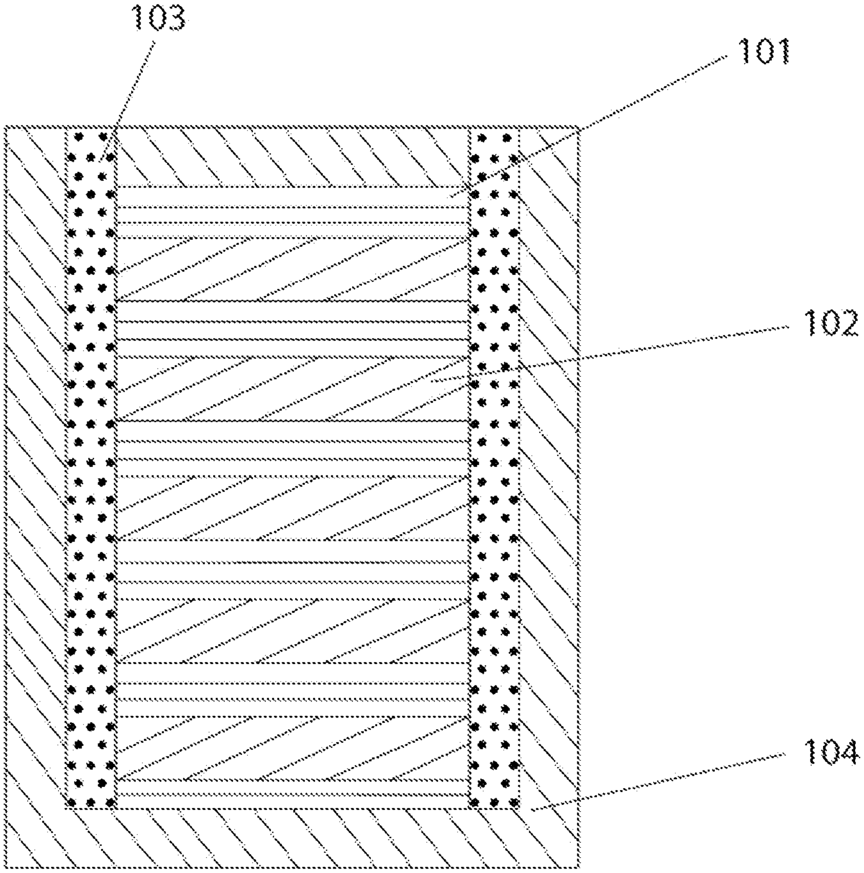
FIG. 1 is an illustrative diagrammatic representation of a nuclear voltaic device that includes layers of diamond-based charge generators stacked adjacent to the radioisotope, all within the diamond shield, as disclosed herein in accordance with some embodiments.

An illustrative example of a nuclear power source disclosed herein can be found in FIG. 1. The nuclear power sources can include at least four separate structures/components: the diamond-based charge generator 101; the radioisotope 102; electric contacts 103; and the radiation shield 104. These components can work together to generate, collect, and extract the charge safely in the following manner. Specifically, the radioisotope 102 can decay and release an alpha particle, beta particle, or neutron which can be the power source. The radiation then can pass through the diamond-based charge generator 101. In the process of doing so, the radiation energy can be absorbed by the diamond in the diamond-based charge generator. The absorbed energy can manifest as electric charge. The charge can then be passed down the electric contacts 103 to the application it may be powering. The radiation shield 104 can contains the radiation emitted by the radioisotope 102 to protect the user from harm.

Figure 2:
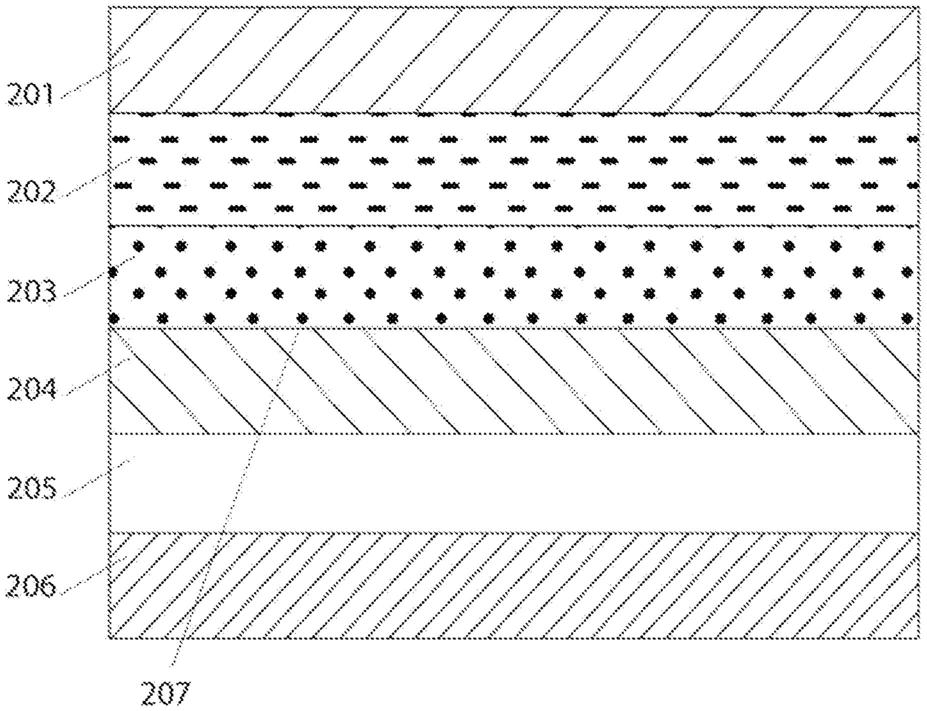
FIG. 2 is an illustrative diagrammatic representation of a diamond-based charge generator, as disclosed herein in accordance with some embodiments.

The radioisotope 102 can decay, generating radiation. The radiation can enter the diamond-based charge generator 101. An illustrative example of a single unit diamond-based charge generator structure can be found in FIG. 2. The diamond-based charge generator can use diamond's semiconductor property as a means of a generating charge. In some embodiments, the charge generator can be a non-diamond wide bandgap semiconductor charge generator (e.g., III-V semiconductors and silicon). As shown in FIG. 2, the diamond-based charge generator can be a layered structure. The diamond-based charge generator can include an ohmic contact 201, $P^+$-type diamond 202, P-type diamond 203, Schottky contact 204, insulator 205, and/or the end contact 206. In some embodiments, there can be more than one insulator such as a MIIM structure. These components can be atomically connected to each other with some degree of variation in the type of connection at the interface. Between the ohmic contact 201 and $P^+$-type diamond 202 can be a bond that bonds them together. For example, the bond can be a chemical bond or a carbide bond (e.g., TiC, ZrC, or HfC). $P^+$-type diamond 202 and P-type diamond 203 can be connected natively as part of the same diamond crystal. The only difference can be that $P^+$-type diamond 202 has a higher doping than the P-type diamond 203. Between the P-type diamond 203 and the Schottky contact 204, there can be a surface treatment that enhances the charge collection. On top of this surface treatment can be the Schottky contact. The P-type diamond 203, surface treatment, and Schottky contact can all be connected atomically next to each other. The connection between the Schottky contact 204, insulator 205 and end contact 206 can also be all atomically connected to each other.

In some embodiments, the diamond-based charge generator does not include insulator and/or end contact if the diamond-based charge generator includes an ohmic contact, $P^+$-type diamond, P-type diamond, and Schottky contact. In some embodiments, the insulator(s) and/or end contact can be replaced by other rectifying components such as, but not limited to, P—N diode, Schottky diode, Zener diode as well as MIM (aka tunneling/Esaki diode).

Each of the above-named structure in the diamond-based charge generator 101 can be a film or layer structure. As such, this design can have several advantages. One can be scalability. In contrast to other forms of power sources such as secondary cells, the functioning layers of the diamond-based charge generator can be confined to the micron scale. As such, the power source could be scaled to the size and shape as required by the application such as but not limited to a planar block for smartphones and a cylindrical tube for AA batteries. By doing, the power source can be manufactured to the required standard by the international standard organizations such as but not limited to ISO, IEC, and ANSI. Accordingly, the diamond-based charge generator's area can be dependent on the form-factor it takes to power the application. An additional benefit to the film structure of the power source is in the fact that since the radioisotope can be spread thin across the surface of the diamond-based charge generator (typically in the thickness of micron-scale or less), there can be a reduction in the probability of the self-absorption of the radiation released by the radioisotope, thereby allowing a greater number of radiation to be absorbed by the diamond-based charge generator to generate a charge. This, in turn, can add to the safety of the power source as the vast majority of the radiation can be captured by the diamond-based charge generator, thereby limiting the number of stray radiations.

The benefit of having an electrically suspended end contact can be so that band structure engineering could be carried out to increase the energy level difference and thus the voltage you can get out of the diamond-based charge generator without the worry of affecting the electrical characteristic of the second diamond layer. In a way it is componentizing that part of the diamond-based charge generator electrically so it increases in versatility.

Radiation from the radioisotopes decay can enter diamond 202 and 203 of the diamond-based charge generator. The energy of the radiation can be absorbed by diamond 202 and 203 through inelastic scattering. The absorbed energy can manifest as a generation of charge carriers in the form of electron-hole pairs, also known as excitons. The charge carriers generated can be directed towards the charge collectors 201 and 204 of the correct polarity due to the built-in field generated by the dopant nuclei of the diamond. The charge carriers can then be collected by the Schottky contact 204. In between the P-type diamond 203 and the Schottky contact 204 can be surface functionalization 207 (e.g., a negative and positive species; or a positive species). For example, a negative species like oxygen can be functionalized on the diamond before Al deposition which can then become AlO, which has a dipole moment that can assist charge extraction through the field it generates that leads to secondary electronic emission. Secondary electronic emission is a general term used for the phenomenon of charge exiting the semiconductor it was made in. This can also be done with a single layer of oxygen and an alkali metal that can then be covered by a bulk Schottky metal. Alternatively, it could also be a solo positive species such as hydrogen. This functionalization can have a dipole moment that generates a field. The charges carriers can be attracted to this field into the Schottky contact 204 resulting in active charge carrier extraction. As such, the power source can exploit the phenomenon known in the arts as Secondary Electron Emission (SEE). This can increase the charge collection efficiency and thus the efficiency of the power source as a whole. The charge carriers that are now in the Schottky contact 204 post active extraction can pass through insulator 205 through quantum tunneling into end contact 206. This process of extracting charge carriers from P-type diamond 203, Schottky contact 204, insulator 205, and end contact 206 can have at least four benefits.

First, it can address the problem of material choice. Those in the art can be faced with the dilemma of choosing Schottky contact materials with either high efficiency or high power. For example, if one was to use Al as a Schottky contact material which is known to have a higher efficiency, then the attainable voltage will be lower due to the smaller work function of the material. Pt, on the other hand, has a very large work function and therefore has a high attainable voltage. However, with Pt, scattering can be prevalent at the diamond-Schottky contact interface resulting in poor efficiency. The nuclear power sources disclosed herein can address these issues by suspending the process into two stages. The first stage can extract the charge carriers efficiently using the SEE into the Schottky contact 204. In the second stage, the charge carriers can be tunneled into the end contact 206 through the insulator 205. Due to the Law of Conservation of Energy, the charge carriers that are extracted from the P-type diamond 203 through to the end contact 206 can benefit from the total energy level difference between them. This phenomenon is known colloquially in the art as 'hot charge carriers'. Thus, in some embodiments where the Schottky contact 204 was to be made of Al which has high efficiency and the end contact 206 out of Pt which has a high attainable voltage, the nuclear power source can benefit from both of those attractive attributes which previous attempts in the art could not.

Second, since the Schottky contact 204 and end contact 206 can be suspended electrically by the insulator 205, the charge accumulation at the Schottky contact 204 can be prevented, where the charge carriers are wicked away into the end contact 206. Charge accumulation is a known issue in the art that causes band bending. Since semiconductor technology relies heavily on bandgap engineering, it can be important to preserve the band structure. The nuclear power sources disclosed herein can achieve this by providing the charge carriers with an electrically suspended exit destination (i.e., end contact 206), leaving the band structure of the P-type diamond 203 desirably unperturbed. This is in contrast to similar devices in the arts where the Schottky contact was the terminal contact and thus the charge accumulation occurs in the Schottky contact which is directly adjacent to the affectible semiconductor.

Third, by the same token as the above of electric suspension, the nuclear power sources disclosed herein can allow versatility in the choice of end contacts 206. Previous devices in the art were restricted in the choice of Schottky contact since it had to take into account of the conformity to the semiconductor it is paired with. With respect to the nuclear power sources disclosed herein, the pairing of the semiconductor and the Schottky contact can already be achieved by P-type diamond 203 and Schottky contact 204. As such, the end contact 206 can be that of one with a large work function or energy level difference than was previously possible.

Fourth, the electric suspension between the Schottky contact 204 and end contact 206 can allow the charge accumulation to occur at the end contact 206. This means that the end contact 206 when charged can also act as a charge reservoir which can increase in voltage proportional to the amount of charge present in accordance with the equation of the mathematical definition of self-capacitance of a conductor.

In some embodiments, the charge carriers collected by the end contact 206 can be channeled into the electric contacts 103, where they can then be channeled to the application that the power source is powering. Any stray radiation or secondary radiation can be captured by the radiation shield 104 (i.e., diamond shield) that surrounds the diamond-based charge generator 101 keeping the user safe. In some embodiments, the radiation shield can surround and/or encompass the diamond-based charge generator(s), the radioisotope(s), and the electric contact(s). In some embodiments, the diamond-based charge generator(s), the radioisotope(s), and the electric contact(s) are within or encompassed by the radiation shield. In some embodiments, any heat generated in the process can be disposed of by using the large surface area of the diamond shield 104, where the diamond shield is used as a heatsink. Diamond can be particularly suited for this due to its extremely high thermal conductivity.

Figure 5:
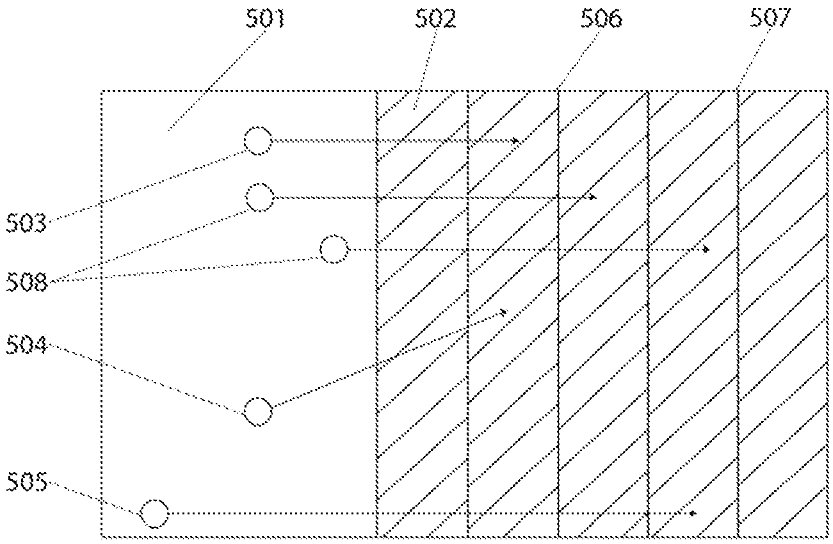
FIG. 5 is an illustrative diagrammatic representation of the operation in the stack configuration of FIG. 1, as disclosed herein in accordance with some embodiments.

As seen from FIG. 1, the power source typically can have multiple diamond-based charge generators units 101 that are connected back to back in a stack using the electric contacts 103. The benefit of having a stack is that it can allow the whole energy spectrum of the radiation to be absorbed whilst maintaining a short distance for the charge carriers to travel through for charge collection. For example, in the case of radiation 503 of FIG. 5, it has only a short distance for the charge carriers to be collected by charge collector 506, increasing efficiency. In contrast, a thick layer of diamond can result in charge recombination and therefore charge loss. In FIG. 5, 501 is the radioisotope that the radiation originates from and 502 is a single unit of the diamond-based charge generator.

An example of radiation with an energy range can be β-rays which have an energy spectrum due to the presence of the secondary decay products such as but not limited to antineutrinos. The stack structure also can accommodate for radiation that is coming at an angle 504, radiations that are being generated from different locations in the radioisotope 508, and radiation with high energy 505 where the higher energy and thus deeper penetrating radiation can be absorbed by a charge collector 507 deeper in the stack. In some embodiments, the power source optionally share electric contacts where the ohmic contact 201 could be connected to the immediately adjacent diamond-based charge generator 101's ohmic contact 201 and similar arrangements could be made for Schottky contact 204 and end contact 206. Other than saving space, this design has the merit of charge carriers not crossing interfaces between each contact. It is known in the art that whenever there are interfaces, there are trap energy states, surface states, and grain boundaries that has the probability of losing charge carriers to recombination. By sharing the same contact with neighboring diamond-based charge generators 101, this loss can be reduced.

Figure 6:
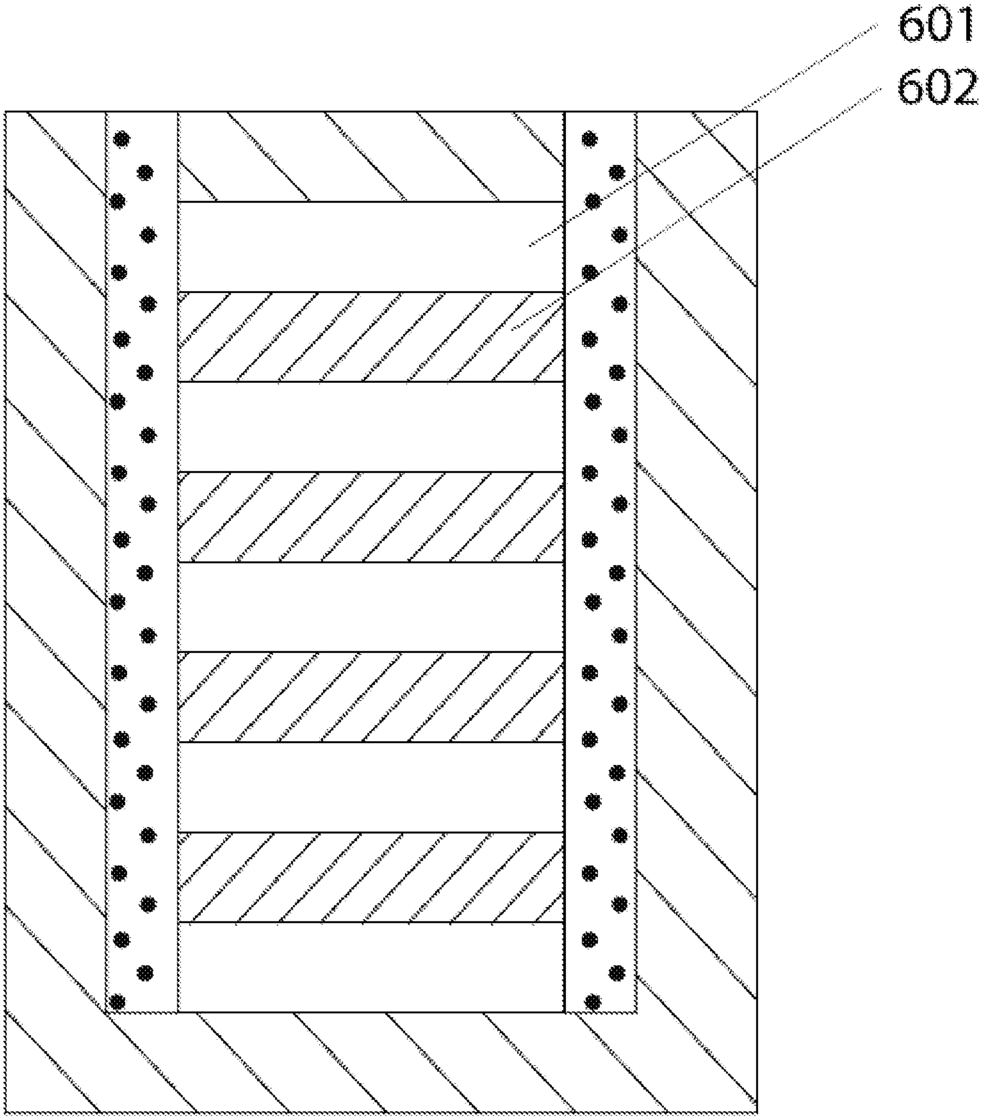
FIG. 6 is an illustrative diagrammatic representation of a nuclear voltaic device where the layers of diamond-based charge generators alternate with the radioisotope, all within the diamond shield, as disclosed herein in accordance with some embodiments.
Figure 7:
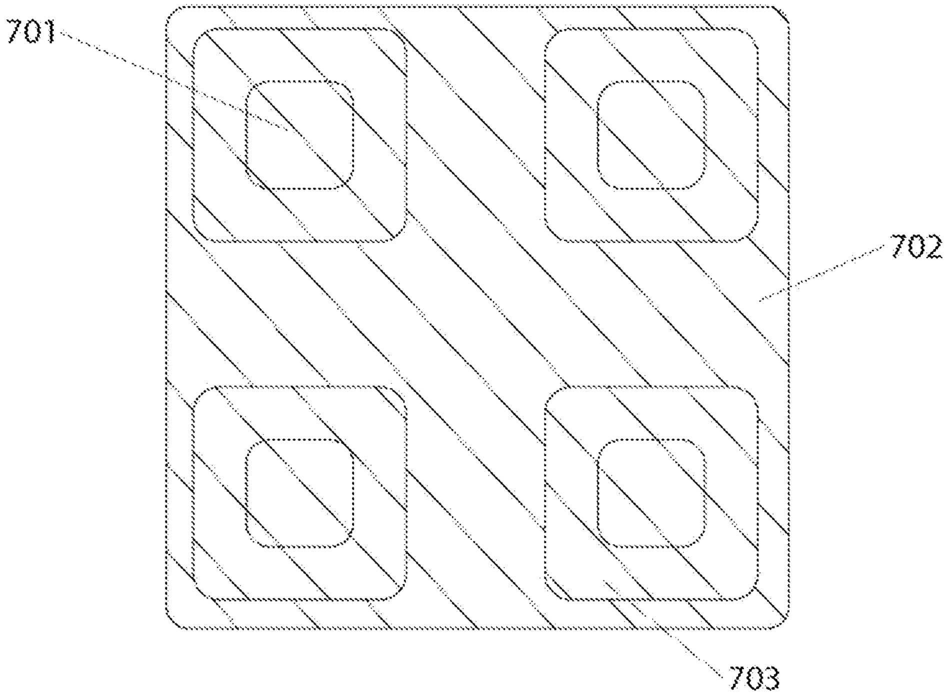
FIG. 7 is an illustrative diagrammatic representation of the secondary layer component of the diamond shield component from a top view, as disclosed herein in accordance with some embodiments.
Figure 8:
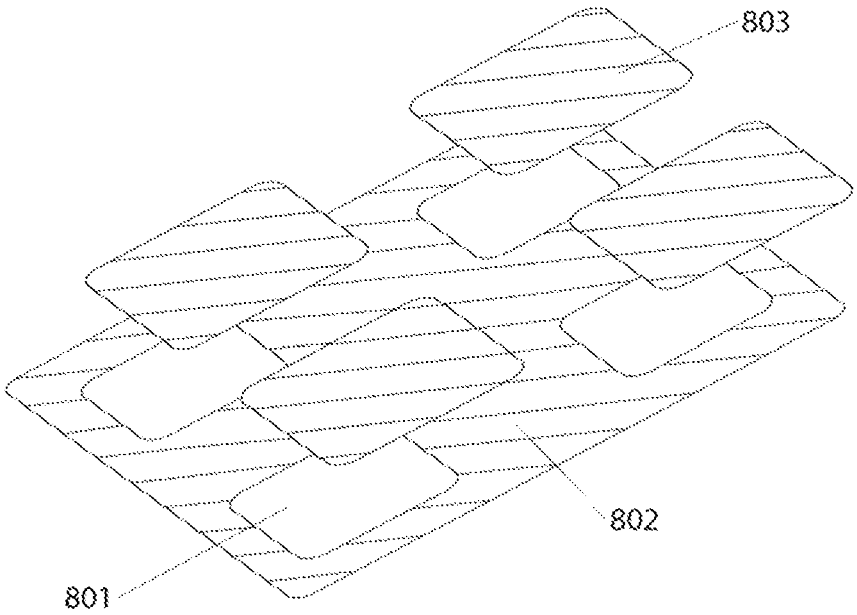
FIG. 8 is an illustrative diagrammatic representation of the secondary layer component of the diamond shield component from an angled view, as disclosed herein in accordance with some embodiments.

In some embodiments, the power source can also be of an alternating sequence of diamond-based charge generator 101 and radioisotope 102 as seen in FIG. 6 where the diamond-based charge generator 601 and radioisotope 602 alternate. This arrangement can be particularly suited for α-rays where the mean free path of the radiation is smaller than the combined thickness of the $P^+$-type diamond 202 and P-type diamond 203, where its typical mean free path is about 15 μm. This can be most applicable in the case of α-rays since the energy it pertains are relatively set at 5.5 MeV and thus does not have an energy spectrum but a discreet energy peak. As such, there does not need to be a stack to accommodate for the spread in energy.

The primary function of the diamond-based charge generator 101 can be to generate a charge. However, due to the design of the nuclear power source disclosed herein (where both the diamond-based charge generator 101 and the diamond shield 104 are made of diamond), the diamond-based charge generator 101 and diamond shield 104 can be fused together during manufacturing. This can allow the diamond-based charge generator to have a secondary function of reinforcing the structure of the power source. Both of these functions can be made possible by the physical, electrical, and chemical properties of diamond. The diamonds used in the nuclear power source can have properties that include, but are not limited to: (1) a wide intrinsic bandgap of 5.5 eV, a value 4.9 times wider than the more commonly used semiconductor, Si (1.12 eV); (2) an energy requirement of 13.6 eV to generate an electron-hole pair; (3) a fracture strength of up to 93 GPa, a value 11.5 times stronger than the common 316 stainless steel; (4) a thermal conductivity of 2,100 $W\ m^{-1}\ K^{-1}$, the highest of all known materials; (5) an extremely high radiation hardness that can withstand exposure to alpha rays of 10 MGy and 5 MeV at $10^{15}$ alpha/$cm^2$ fluency (1 Grad equivalent); and beta rays of 2.5 MGy (Co-60 source) and 5 kGy/h for 500 h (integral dose of 2.5 MGy from Co-60); (6) good absorption to both alpha and beta rays, where an SCD is known to have a radiation stopping distance of 15 μm for alpha (5.5 MeV, Am-241 source) and 80 μm for beta (49 keV mean energy, C-14 source); (7) excellent chemical inertness; and (8) electric insulator intrinsically. It should be noted that these values can depend on the type, purity, and crystallinity of the diamond in accordance with the variants of the diamond and therefore can be adjusted accordingly with the values accepted in the art. In some embodiments, the diamond-based charge generator 101 can operate independently without the other components in FIG. 1 so long as there is a source of radiation. The source of radiation includes, but is not limited to, radioisotopes, e-beams sources, secondary radiations sources, and photon sources.

In some embodiments, the $P^+$-type diamond 202 and P-type diamond 203 are neighboring structures to the ohmic contact 201, where the charge can be generated through the inelastic scattering of radiation that originates from the radioisotope 102. This can be made possible by the fact that diamond is a wide bandgap semiconductor. Since 13.6 eV can be required to generate an electron-hole pair when radiation passes through diamond 202 and 203, the number of electron-hole pairs generated can be equal to the energy of the radiation divided by 13.6 eV. The type of radiation used by the power source can include, but is not limited to, alpha, beta, gamma, photon, or neutron. In the case of neutron, one or more conversion material that converts neutrons to alpha can be used such as B-10, He-3, or Li-6 prior to the scattering event. In some embodiments, the conversion material in between the radioisotope and the diamond generator can be connected atomically. So when the radiation escapes the radioisotope layer, the radiation can get converted before it enters the diamond generator. Another can be where the conversion material is integrated as part of the diamond crystal whether in the diamond generator or as part of the diamond cage described in FIG. 3. B-10 can be the conversion material for such an embodiment since boron is a dopant for diamond and it can become part of the diamond's crystal structure. In some embodiments, the radiation can be alpha, beta, or a combination of the two.

Diamond is rather unusual compared to other semiconductors such as Si and GaAs as it is known in the art to have a near 100% charge collection efficiency. This can be due to its wide bandgap where the width of the bandgap makes charge recombination more difficult and therefore has a long carrier lifetime of 2000 ns, resulting in the charge carriers having more time for it to be collected. This can allow the nuclear power source to have a high device efficiency. Another benefit of the wide bandgap is in the fact that it can have an open voltage across its Schottky interface of approximately 2 V. This value can be important to the nuclear power source since this value is within the comfort of being stepped up or down electronically to voltages that are used by common applications. Some examples of these common appliances includes, but are not limited to, smartphones (3.7 V), electric vehicles (4.2 V), and IoTs (<1.5 V). The high voltage can allow the nuclear power source to be of higher power than its more common related devices allowing the nuclear power source to have a much wider range of application than a device of similar nature.

Another advantage that the nuclear power sources disclosed herein have over similar devices is their radiation hardness. Si-based technology of similar type was unable to make use of the long-lasting nature of the power source, i.e., radioisotope 102. This was due to the inherent shortcomings of Si where it suffered from displacement defect where the radiation breaks the crystal bonds of the semiconductor, slowly degrading its quality. As such, the device was unable to deliver power to the fullest extent of what the radioisotope 102 could potentially have done. Diamond on the other hand due to the above-mentioned radiation hardness can withstand radiation damage and thus can be able to preserve the nuclear power source device integrity until the end of radioisotope life. With the above-stated benefit in mind, the diamonds used in the nuclear power source disclosed herein can include, but is not limited to, the configurations below.

In some embodiments, the diamond(s) in the nuclear power source can be used at least in the diamond-based charge generator (e.g, diamonds 202 and 203) and/or the radiation shield. In some embodiments, the diamond(s) of the power source can have a crystallinity that contains Single-Crystalline Diamond (SCD), Polycrystalline Diamond (PCD), Diamond-Like Carbon (DLC), Nano-Diamonds (ND), sintered diamonds, and/or amorphous diamond. In some embodiments, the diamond(s) can be of artificial or natural in origin or both, such as artificial diamond grown over the natural diamond. In some embodiments, the diamond(s) can be of diamond-like in nature thus in addition to pure diamonds it also contains variants of diamonds such as diamondoids. Some example include, but are not limited to, lonsdaleite and adamantane. In some embodiments, the diamond(s) of the nuclear power source can be Type Ia SCD, Type Ib SCD, Type Ha SCD, Type IIb SCD, PCD, or sintered. In some embodiments, the diamond(s) in the diamond-based charge generator can be Type IIa SCD and/or Type IIb SCD and the diamond(s) in the radiation shield can be PCD and/or sintered. In some embodiments, the diamond(s) can be doped either in p-type or n-type. In some embodiments, the p-type dopant is boron. In some embodiments, the dopants could either be added interstitially between the carbon atoms in the diamond crystal or incorporated as part of the diamond crystal in place of the carbon. In some embodiments, the concentration of the dopant (e.g., boron) can be about $10^{16}$ $cm^{-3}$ to $10^{23}$ $cm^{-3}$ or about $10^{18}$ $cm^{-3}$ to $10^{21}$ $cm^{-3}$ or similar such that the diamond is a $P^+$-type for the diamond 202 near the interface that forms the ohmic contact. However, it could also be of lower or higher concentration so long as it could form an ohmic contact depending on the contact material. In some embodiments, the diamond 202 at this concentration can be considered to be a $P^+$-type. In some embodiments, the concentration of dopant (e.g., boron) for the diamond 203 can be about $10^{12}$ $cm^{-3}$ to $10^{19}$ $cm^{-3}$ or about $10^{14}$ $cm^{-3}$ to $10^{17}$ $cm^{-3}$ or similar such that the diamond is a P-type.

In some embodiments, the thickness of the $P^+$-type diamond 202 can be <1 μm or about 0.001-1 μm and P-type diamond 203 to be 15 μm or about 0.1-1000 μm. This thickness can be to accommodate the penetration depth of the alpha rays. It is known in the art that charge generation occurs mostly at the terminal depth of the radiation due to the increased interaction time with the surrounding material. As such, by generating as much charge as possible close to the charge collector, a greater charge collection efficiency can be achieved. The generated charge can then be guided to the correct polarity by the built-in field caused by the dopants. Although the preferred dopant type is P-type to create a P-Schottky configuration, alternative configurations such as P—N, N-Schottky can also be contained.

In some embodiments, the diamond(s) can be chemically inert to the surrounding environment, where the environment is defined as the immediate medium that it is in contact with. In some embodiments, $P^+$-type diamond 202 and P-type diamond 203 can be fabricated using CVD. However, other forms of diamond fabrication such as, but not limited to, HPHT, PVD, sintering, and detonation can also be used. The CVD method of the diamond fabrication is an established technique practiced by those in the art. Most often, the CVD of diamond fabrication can include having a substrate, commonly diamond that the carbon atom from the carbon source could grow on by repeating its crystal pattern. The carbon can be provided by a reactive carbon source gas, most commonly, but not limited to, radicalized methane ($CH_4$). The carbon source could also be other carbon-containing radicals and species such as hydrocarbons, halocarbons, and other forms of carbon such as, but not limited to, CO and $CO_2$. The hydrocarbon can be in the form of $C_xH_y$ and/or $C_xH_yX_z$ where x, y and z range from 1-10 in any combination and the X is a halogen. Along with the carbon source gas, other reactive and non-reactive gases can be present. Some examples include, but are not limited to, $H_2$, $O_2$, $N_2$, $B_2H_6$, $B(CH_3)_3$, $NH_3$, and noble gases such as helium, argon and others. In some embodiments, the elements include their isotopes such as, but not limited to, carbon-12, carbon-13 and carbon-14 for carbon and deuterium and tritium for hydrogen. The hydrogen can be there to incinerate the unwanted $sp^2$ carbon bonds as well as form hydrogen surface functionalization (hereafter termination). Oxygen can be there to etch the diamond surface and/or oxygen terminate the diamond. The nitrogen can be there to catalyze the growth of diamond, dope the diamond to change the electrical properties, and/or nitrogen terminate the diamond in any combination. A typical nitrogen concentration could go up to $10^{19}$ atoms per $cm^{-3}$. Boron can be there as a dopant to change the electrical conductivity of the diamond and its typical concentration can be at most about $10^{21}$ atoms per $cm^{-3}$. The inclusion of boron can be carried out through the addition of the following to the plasma, diborane ($B_2H_6$), trimethyl borane, boron oxide, boric acid, and/or solid boron.

In some embodiments, the additives described above can be added substitutionally or interstitially in the diamond lattice. The reactivity of the gases can come from the dissociation of the gas, therefore its radicalization, often resulting in plasma formation. This can be induced by, but not limited to, the use of microwaves, radiofrequency (RF) waves, microwave enhanced CVD (MECVD), Metalorganic CVD (MOCVD), lasers, hot filament, DC arc, conformal diamond coating, and torch.

In some embodiments, the CVD can be one of fast growth or slow growth, each with their advantages. In some embodiments, for slow growth, the base diamond can be loaded into a vacuum chamber and the pressure can be reduced to <$10^{-6}$ mBar. Hydrogen gas can be added into the chamber until 3 torr of chamber pressure is achieved. Plasma can be ignited using a magnetron generated standing microwave and chamber pressure can be increased using hydrogen to 40 torr. The diamond can be grown for 315 min at 870° C. using 0.55% $CH_4/(H_2+CH_4)$ plasma. This can be followed by sample exposure to 5 min of pure hydrogen plasma at 700° C. to incinerate any unwanted $sp^2$ carbon contaminants. This process can grow a 340 nm film of the diamond. In some embodiments, for fast growth, 160 torr chamber pressure, 3% $N_2/CH_4$, 12% $CH_4/H_2$, 1200° C. can be used.

The effectiveness of the nuclear power source can be influenced by the quality of the material that it is made out of Namely, for diamond 104, 202, and 203; radioisotope 102; electric contacts 103; charge collectors 201 and 204; and the nanostructure 204, 205, and 206, the greater the quality of the material, the greater the performance of the power source can be.

Radioisotope 102 can be used as the power source of the nuclear power source, where the output power of the radioisotope can define the nuclear power source's power, output profile, and longevity. In some embodiments, the radioisotope 102 can contain one or more of the following radioisotopes: P-32, V-48, Cf-253, Cr-51, Md-258, Be-7, Cf-254, Co-56, Sc-46, S-35, Tm-168, Fm-257, Tm-170, Po-210, Ca-45, Au-195, Zn-65, Co-57, V-49, Cf-248, Ru-106, Np-235, Cd-109, Tm-171, Cs-134, Na-22, Fe-55, Rh-101, Co-60, Kr-85, H-3, Cf-250, Nb-93m, Sr-90, Cm-243, Cs-137, Ti-44, U-232, Pu-238, Sm-151, Ni-63, Si-32, Ar-39, Cf-249, Ag-108, Am-241, AmBe, Hg-194, Nb-91, Cf-251, Ho-166m1, Bk-247, Ra-226, Mo-93, Ho-153, Cm-246, C-14, Pu-240, Th-229, Am-243, Cm-245, Cm-250, Nb-94, Pu239, U-233, U-234, Pu-242, Np-237, U-235, U-236, and U-238. This list can also cover their daughter isotopes, isomers as well as internally converted ones. In some embodiments, the blend can take into account the equilibrium of each species. In some embodiments, the isotopes can be of a metastable state as well as non-metastable state, such in the case of nuclear isomers. In addition to the above radioisotopes in its original state, the radioisotope 102 can include the possible use of isotopes that could be internally converted to another species such as through the process of transmutation. In some embodiments, the radioisotope(s) can also contain the daughter isotopes of the above-listed radioisotopes. In addition, the radioisotope(s) can be natural, recycled, or artificial in origin.

In some embodiments, the output power of the nuclear power source can be dependent on the power density (and by association specific power) of the radioisotope. Examples include, but are not limited to, 324 W/kg (H-3), 5.8 W/kg (Ni-63), 96.2 W/kg (Cs-137), 160 W/kg (Sr-90), 700 W/kg (U-232), 555 W/kg (Pu-238), 106 W/kg (Am-241), and 2777 W/kg (Cm-244). These values are either comparable or greater than the current state of the art of Li-ion batteries, where it is generally agreed upon by those in the art to have a specific power of 180 W/kg to 300 W/kg.

In some embodiments, the radioisotope(s) 102 can be a blend of more than one radioisotopes. By doing so, the nuclear power source can tune the output profile by choosing isotopes of different half-lives, radioactivity, decay chain, and radiation energy to fulfil the power requirement of the application that the nuclear power source is powering. As such, by selecting certain radioisotopes, the nuclear power source can have a more level output, desired device powering lifetime, and desired output. This can include the equilibrium condition each individual isotopes may be in. For example, this can include secular, transient, and no equilibrium, where its nuclei number, and in turn, its activity can be determined through the Bateman equation. In some embodiments, the radiation to power the nuclear power source can be alpha, beta, and/or neutrons. The former two can be used directly to generate charge in the diamond 202 and 203. The neutron can also be used if it is converted into alpha radiation by using a conversion material such as B-10, He-3, and Li-6, which has a reaction cross-section of 3835 barns, 5333 barns, and 940 barns respectively. The neutron converted to alpha can then undergo scattering to generate a charge. It is generally agreed upon by those in the art that alpha radiation has an energy of 5.5 MeV or similar and therefore a discreet energy profile. Beta radiation, on the other hand, is known to have an energy spectrum. The outer layer of the radioisotope can also optionally be coated with a thin insulating layer to prevent short circuit.

The radioisotope(s) 102 can be in several different configurations. In some embodiments, these configurations can include a single or multi-layer of radioisotopes either as single species or blend. One example of which is a layer of alpha-emitting radioisotope can be deposited on top of the diamond-based charge generator. The following layer on top can be that of a beta ray emitting radioisotope. Since alpha rays have a shorter penetration depth as discussed earlier, the shorter travelling alpha can benefit from being close to the diamond-based charge generator while the further penetrating beta emitter can still generate an electric charge by penetrating through the alpha-emitting radioisotope layer.

Figure 3:
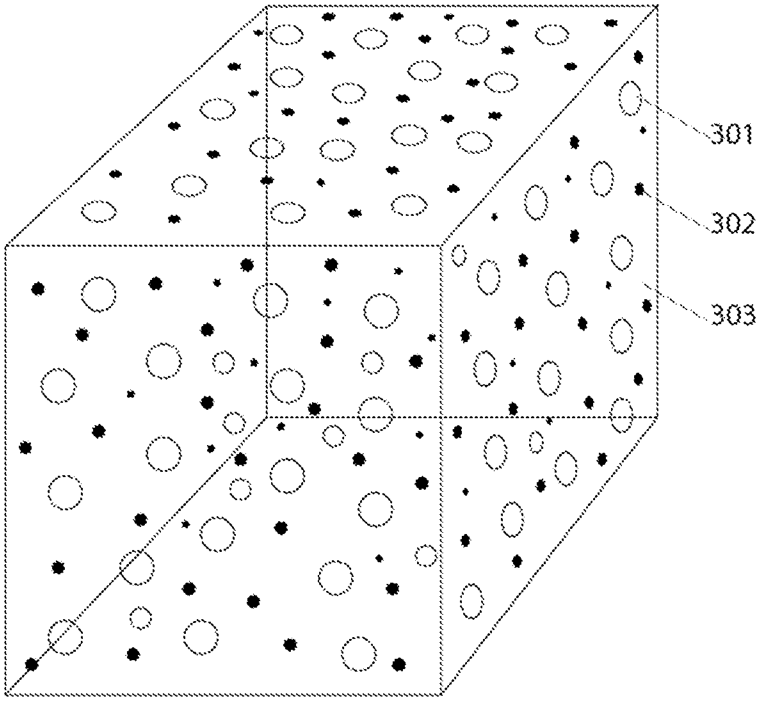
FIG. 3 is an illustrative diagrammatic representation of a radioisotope component where the radioisotopes are embedded in the diamond crystal, as disclosed herein in accordance with some embodiments.

In some embodiments, the radioisotope(s) can be embedded in diamond as shown in FIG. 3. In some embodiments, the structure in FIG. 3 can be used as a replacement for the radioisotope 102, whereby it stays on the outside of the diamond-based charge generator 101. In some embodiments, the structure in FIG. 3 can replace at least one of the diamond layers 202, 203 in the diamond generator. In these embodiments, the boron concentration can be matched in the way described for FIG. 2 such that the device can function in the same way as described in the description of the diamond-based charge generator.

The diamond(s) that the radioisotope(s) is embedded can be any combination of the diamonds disclosed above with respect to the diamond-based charge generator and the radiation shield. In FIG. 3, the radioisotopes 301 are embedded in the diamond crystal 303 either interstitially or as part of the crystal. This configuration can address the aforementioned challenge currently faced by those in the art, of radioisotope theft and misuse. By embedding the radioisotopes in the crystal lattice of diamond, the radioisotopes can be atomically disseminated, making it very difficult or near impossible to access the radioisotopes for misuse. In addition, its safety as a bulk material can be achieved since the embedding can be carried out within a B-10 302 rich p-type diamond, preferably with a concentration of up to $10^{21}$ $cm^{-3}$ or similar. By doing so when a neutron is introduced to the radioisotope embedded diamond in aims of misuse, it can inhibit the chain reaction by converting the neurons into alphas. This can prevent fissile or fissionable radioisotopes to cause a chain reaction and therefore minimize the risk of it being misused. This also means that fissile and fissionable material that was previously seen as a high-risk material in the art can be used as a power source with lowered risk.

The maximum amount of the radioisotope 301 that can be added to the crystal depends on the critical mass of the individual radioisotope. Some examples include, but are not limited to, Am-241 (55 kg to 77 kg), Pu-238 (9.04 kg to 10.07 kg) and Cm-244 (13.5 kg to 30 kg), where the geometry of the radioisotopes of the quoted value is a bare sphere. The values are known by those in the art to vary widely according to the nuclear fission cross-section, density, shape, enrichment, purity, temperature, and presence of reflectors. The embedding of the radioisotopes 301 can be carried out using, but not limited to, the following methods: ion implantation, CVD, PVD, and MBE. The embedded radioisotope configuration has the added benefit of making the overall structure of the nuclear power source stronger by being part of the diamond crystal 303, which as discussed earlier is of extremely high strength adding to the safety of the nuclear power source.

The radioisotope embedded diamond and C-14 diamond can hold a special status. As, unlike the other configurations where the radioisotope 102 is on the outside of the diamond-based charge generator (e.g., FIG. 2), in some embodiments, the radioisotope embedded diamond and C-14 diamond can also operate when placed within the diamond-based charge generator as a replacement of 202 and 203. In such cases, the dopant (boron or others) content of the replacement for 202 and 203 can be of similar concentration to 202 and 203. In such embodiments, this can reduce the space occupied by the radioisotope 102 and reduce heat production due to the reduction of self-absorption of radiation by the radioisotope as well as increase efficiency due to the immediate conversion of radiation into electron-hole pairs by the surrounding diamond 303.

In some embodiments, electric contact 103, ohmic contact 201, Schottky contact 204, insulator 205, and/or the end contact 206 can be made of metallic or ceramic materials. Although heavier metals can be used effectively for the nuclear power source, the choice of metals/alloys/ceramics can be based on light metals to avoid the activation issue where heavier metals become radioactive in itself due to being exposed to radiation. In addition, material(s) can be adjusted according to the requirement of the application the nuclear power source will be powering. For example, applications, where a higher tolerance to temperature is required, a material of higher melting point will be preferred over one with a lower melting point.

Electric contact 103, ohmic contact 201, Schottky contact 204, insulator 205, and/or the end contact 206 can be deposited through various metallization techniques known in the art. This includes, but is not limited to, PVD, CVD, MBE, ALD, and chemical reactions. Examples of PVD include, but are not limited to, sputtering, E-beam evaporation, and thermal evaporation. Sputtering can be used for deposition due to the higher energy nature of the deposited metal or alloy. This can, in turn, allow the easier formation of the carbide bond at the interface between the ohmic contact 201 and the $P^+$-type diamond 202. The sputtering conditions can include, but are not limited to, pre-deposition chamber pressure of $<10^{-7}$ mBar, argon plasma at a gas flow rate of 10 SCCM, power of 150 W, current of 0.40 A, voltage of 372 V, and net chamber pressure with argon gas of $3.0\times10^{-3}$ mBar. In the case of insulators, the RF equivalent of the above can be used to deposit.

In some embodiments, electric contact 103, can be made of a metal, alloy, or doped semiconductor that has a suitably high electric conductivity. Examples include, but are not limited to, Ag, Cu, Au, Al, W, Zn, Pt, Ti, Ni, and any alloy that is of high electric conductivity based on the above such as CuMg (Cu-0.2 wt % Mg) and CuZr (Cu-0.3% Zr). Alternatively, other modes of conduction such as heavily doped diamond ($P^+$-type, $10^{21}$ $cm^{-3}$ boron concentration or similar) or $sp^2$ carbon such as graphene or graphene-like materials (carbon nanotube, carbon onion, fullerene etc. . . . ) as well as heavily doped non-diamond semiconductors such as but not limited to Si and GaAs, can be used. In some embodiments, the metal or alloy for the electric contact can be Al based on the fact that it is known to be light enough to be radiation blind and of high conductivity.

Figure 4:
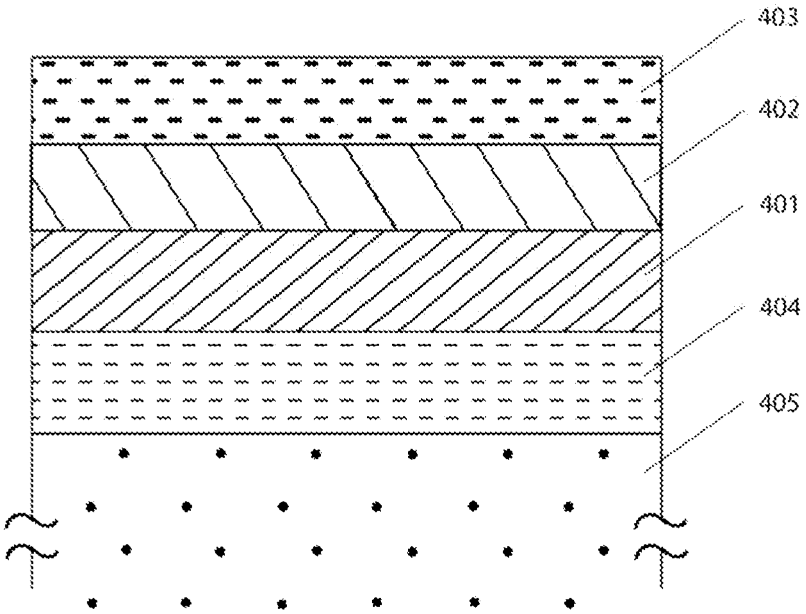
FIG. 4 is an illustrative diagrammatic representation of an ohmic contact, as disclosed herein in accordance with some embodiments.

In some embodiments, ohmic contact 201, can be a charge collector made of a metal or alloy that can form an ohmic contact with the $P^+$-type diamond 202. The ohmic contact can collect the positive charge carriers that are generated by the scattering event within the diamond-based charge generator 101. The contact can be made ohmic through the deposition of metal or alloy over a heavily doped diamond (which can be any of the diamonds previously explained above) of $10^{21}$ $cm^{-3}$ boron doped $P^+$-type diamond or similar. The act of doing so can form a graded interface making the interface ohmic. The metal or alloy used for the ohmic contact can include at least one of, but are not limited to, Ti, Zr, and Hf. The contact metals or alloys that are known to demonstrate ohmic behaviour by those in the art include, but are not limited to, TiC, ZrC, HfC, Zr—Ti—C, Hf—Ti—C, Zr—Hf—C, Ti—Hf—C, and Ti—Zr—Hf—C. In some embodiments, the contact metals and alloys can operate without the carbide but are preferred to do with so to promote preferential energy states for charge extraction. In some embodiments, the ohmic contact 201 can be made of monolayers or multilayers as shown in FIG. 4. For example, a diffusion barrier 402 could be added between the lead contact 403 (typically Au or Al) to prevent self-contamination amongst the multilayers whilst maintaining a bulk conductivity characteristic of the lead contact 403. The diffusion barrier 402 can include, but is not limited to, Mo, W, Ta, Re, Rh, Os, and Pt. In some embodiments, the order of the ohmic contact layers is the contact layer 401, the diffusion barrier 402, followed by the lead contact layer 403. Alternatively, the ohmic contact can be functional with the contact layer 401 alone. The $P^+$-type diamond 404 can be the highly doped diamond layer that allows the interface between the ohmic contact 401 to be ohmic and P-type diamond 405 can be the diamond layer that consists of the bulk of the diamond in the diamond-based charge generator 101. The carbide formation conditions change according to the metals or alloys that are being used in the ohmic contact. In the example of Ti/Pt/Au, the annealing can occur at 900° C. for 120 min. However, for a Ti monolayer, the annealing condition can be 400° C. or more for 180 min. The thickness of the ohmic contact 201 can be sufficiently thick enough for charge collection to be made possible. In some embodiments, the total thickness (sum of the thickness of the multilayers) can be 25 nm to 1000 nm.

In some embodiments, the materials choice for the Schottky contact 204, insulator 205, and/or end contact 206 can depend on each other as they work together to perform electric rectification (diode action) which the nuclear power source capitalizes on. In addition, the material choice of Schottky contact 204 can be able to form a Schottky interface with diamond (e.g., 203). As such, the material choice of the aforementioned components can include materials that can both form a Schottky interface with diamond and those that can then subsequently work together with the said material to form a diode.

The Schottky contact 204 can be a charge collector made of a metal or alloy that can form a Schottky Interface between the P-type diamond 203. Examples of the metal or alloy can include, but is not limited to, Al, Ti, Ni, Au, Ag, Nb, Cu, Cr, and Pt. In some embodiments, the metals or alloys are those which can form a dipole moment at the surface by reacting with the surface termination of the diamond. One such example can be oxygen terminated P-type diamond 203 overlaid by Al. The AlO has a dipole that can increase the charge collection efficiency due to the field generated where the field actively ejects the charge carriers from within the diamond to the contact in the form of secondary electron emission. Alternatively, a monolayer of other materials such as alkali metals can be used in conjunction with the termination to create the dipole, which can then be overlaid by another material to provide the bulk substance of the contact. One example of this is CsO and LiO. The alkali metals can include, but are not limited to, Li, Na, K, Rb, Cs, and Fr. Alternatively, any surface functionalization that is known to generate dipoles can also be contained such as but not limited to H. In some embodiments, the thickness of the Schottky contact 204 can be 25 nm to 1000 nm.

The insulator 205 can be a component that is placed in between the Schottky contact 204 and the end contact 206. The purpose of this material can be to isolate the Schottky contact 204 and the end contact 206 electrically such that the components Schottky contact 204, insulator 20,5 and the end contact 206 can operate as a Metal-Insulator-Metal (MIM) diode, alternatively Metal-Insulator-Insulator-Metal (MIIM). In some embodiments, the material for the insulator can depend on whether the construction is of MIM or MIIM. For MIM, the material can include, but is not limited to, ZnO, CuO, NiO, $AlO_x$, $SiO_2$, $TiO_2$, NiO, $Nb_2O_5$, and $Al_2O_3$. For MIIM, the material can include, but is not limited to, NiO/ZnO, $Cr_2O_3/Al_2O_3$, $HfO_2/TiO_2$, $Al_2O_3/TiO_2$, and $Nb_2O_5/Ta_2O_5$. In some embodiments, the total thickness of the insulator 204 can be up to about 1000 nm or similar. Typically, the thickness can be in the about 1 nm to 10 nm range.

The end contact can be the end component of the MIM or MIIM structure that can collect the charge that has tunneled through the insulator. This charge can then be conducted through the electric contact 103 that will later power applications. The metal/alloy of the end contact can depend on its work function as it is known in the art that the greater the work function, the greater the difference in energy level with the P-type diamond can be. This then can directly translate to a higher attainable voltage generated from the nuclear power source. For performance, Pt can be the material. However, Ni can also be of preference due to it having a good balance between large work function and radiation blindness as well as cost performance. Other materials for the end contact include, but are not limited, to Pd, Au, Ir, Ta, Ag, Al, Cr, Ti, W, and doped semiconductors. In some embodiments, the thickness of the end contact 206 can be about 25 nm to 1000 nm.

The components Schottky contact 204, insulator 205, and end contact 206 can alternatively be replaced by devices and nanostructures of similar function. These can include, but are not limited to, P—N diodes, Zenar diodes, Tunneling diodes, and Schottky diodes. In some embodiments, the alternative device can be made of any semiconductors including, but not limited to, Si, SiN, SiC, BN, GaAs, GaN, AlGaN, and AlN as well as non-semiconductor based rectifying devices. In some embodiments, the combination of Schottky contact 204, insulator 205, and end contact 206 materials are such that it can increase asymmetry.

Radiation shield 104 can be a component of the power source that can protect the user from radiation, thermal, electrical, and/or mechanical harm. In some embodiments, the radiation shield can include a layer of diamond 901, 1001 which can also be accompanied by a secondary layer 702, 703, 803, 802, 902, 903, 1002, either embedded inside the diamond as seen from FIG. 9 or superficially on the outside as seen from FIG. 10. In some embodiments, depending on the nature of the radiation it is containing, the radiation shield can be a layer where diamond alone could sufficiently achieve radiation protection. As such, radiation shield 104 can operate with diamond 901, 1001 alone.

Figure 9:
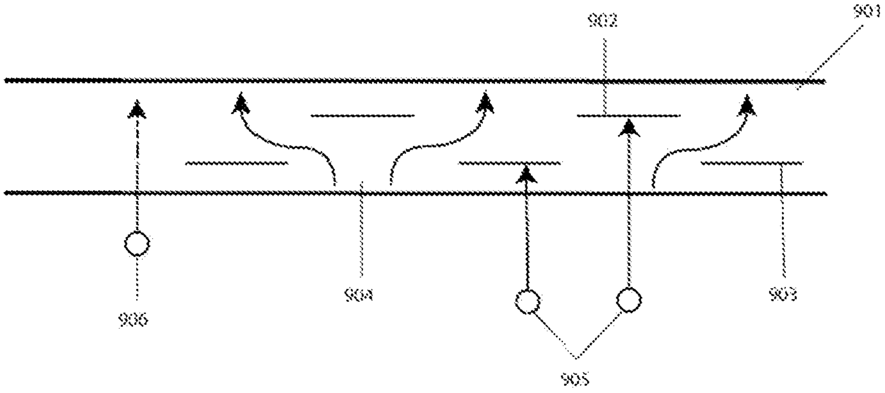
FIG. 9 is an illustrative diagrammatic representation of the secondary layer component of the diamond shield component from a cross-sectional view with its operations, as disclosed herein in accordance with some embodiments.
Figure 10:
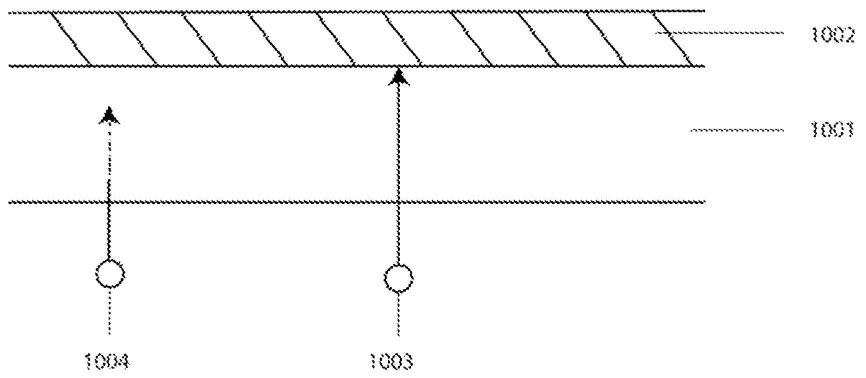
FIG. 10 is an illustrative diagrammatic representation of the secondary layer component of the diamond shield component from a cross-sectional view with its operations, as disclosed herein in accordance with some embodiments.

The diamond in the radiation shield 104 can be designed to absorb the radiation's energy through inelastic scattering as seen from 906 in FIGS. 9 and 1004 in FIG. 10 akin to the way the diamond-based charge generator 101 absorbs and generates charge carriers. In the process of doing so, the radiation will be attenuated to the point where it is stopped comprehensively, as seen from FIG. 9 906 and FIG. 10 1004.

The thickness of the diamond of the radiation shield can depend on the radiation type and energy it is shielding. For a α-rays, where the mean free path is known to be small due to its high interactivity to matter and a set energy of 5.5 MeV, the thickness to stop this radiation and therefore the thickness of the diamond layer 901, 1001 of the radiation shield can be at least about 15 μm. For β-rays, due to the greater mean free path and the non-discreet energy profile, the thickness of the shield can be relative to the required stopping distance of the β-ray with the maximum energy. For example, Sr-90/Y-90 has an average β-rays energy of 0.939 MeV and maximum energy of 2.28 MeV. As such, the radiation shield 104 can be made thicker than the amount of diamond required to stop β-rays of energy 2.28 MeV. In the example of Sr-90/Y-90, the diamond of the radiation shield can be at least 3116 μm in thickness.

The radiation shield 104 can be of low doping thus electrically be non-conducting. This can allow the user to safely handle the embodiment without the risk of electric shock, thereby making the nuclear power source electrically safe. The use of a diamond has the additional benefit of making the nuclear power source mechanically safe. Diamond is one of the hardest and toughest material in existence. This toughness can further be increased by the fact that diamond-based charge generator 101's diamond layer(s) can fuse onto the diamond shield 104 natively. As such, the nuclear power source can be reinforced not only by the radiation shield 104 alone, but also by the laminate diamond structure of the diamond-based charge generator 101 stack in effect making the nuclear power source a solid piece of diamond with layers of radioisotopes, contacts, and insulators contained within it. Furthermore, this also has the advantage of preventing tampering.

In some embodiments, the chemical inertness of diamond can enable the power source to be environmentally inert and thus benign to the environment making the power source environmentally friendly. The thickness of the radiation shield 104 can vary according to the application where the international standard organizations dictate the expected safety of the device and according to the radioisotope used. For example, a version of the nuclear power source that powers an electrical vehicle can be expected to have a thicker layer of diamond shield to withstand a traffic collision whilst a hearing aid battery can be expected to survive daily use. Radioisotopes on the other hand, as previously discussed, can have a varied stopping distance according to the type of radiation and its radioisotope that it originates from. As such, the thickness of the radiation shield 104 can be that which is thick enough to contain the radiation whilst able to conform to the expected standard of the safety regulation in the country of use.

In some embodiments, the radiation shield can include a secondary layer. The secondary layer 702, 703, 802, 803, 902, 903, 1002 in the radiation shield 104 can serve two purposes. First, it can protect the user from secondary radiations such as the Bremsstrahlung radiation. It is a known issue in the art that as charged radiations pass through matter it decelerates due to the electrostatic attraction to the nuclei. The lost energy can manifest as high energy photons typically in the UV and X-rays range. The secondary layer 702, 703, 802, 803, 902, 903, 1002 can intercept the photons 905, 1003, preventing user exposure. 904 is the flow of heat from the inner parts of the device, diamond-based charge generator 101.

Another function of the secondary layer can be to cut the oxygen supply. In an oxygen-rich environment, the diamond is known to be able to combust at 800° C. However, in the absence of oxygen, diamond can survive to a much higher temperature of 3800° C. As such, by coating the entire power source/device in a secondary layer 1002 which has a high melting point, such as but not limited to Cr with a melting point of 1900° C., the survivable temperature of the nuclear power source could be elevated. This approach can address the issues faced by previous attempts in the art such as Pu-238 powered pacemakers, where the risk of it being combusted during cremation was of significant concern. The temperature used for cremation can typically be up to 1000° C. and therefore by taking the nuclear power source's approach of coating the device in a secondary layer 1002, this issue can be mitigated. For applications where the risk of high temperature is low, the secondary layer 702, 703, 802, 803, 902, 903, 1002 can alternatively be patterned such that it contains thermal vents/apertures 701, 801 within the layer capped by another secondary layer 703, 803, 902. The secondary cap layers can be bigger than the vents/apertures such that the cap layers cover the vents/apertures. This arrangement can allow secondary radiations to be captured by the secondary layers 702, 703, 802, 803, 902, 903, 1002 whilst having a thermally conductive channel that can conduct heat 904 from within the device to the outer surface, thereby making use of diamond's extremely high thermal conductivity. This configuration can allow the nuclear power source to release any heat generated effectively mitigating thermal risk to the user.

In some embodiments, the thickness of the secondary layer is about 1000 nm. In some embodiments, the size of the hole in the secondary layer 702, 802, 903, can be about 300×300 μm with the size of the secondary layer cap 703, 803, 902, of size about 700 μm×700 μm with a gap of about 50 μm between the secondary layer 702, 802, 903 and the secondary layer cap 703, 803, 902.

In some embodiments, the diamond used in the diamond layer of the radiation shield 104 can be that of Single-Crystalline Diamond (SCD), Polycrystalline Diamond (PCD), Diamond-Like Carbon (DLC), Nano-Diamonds (ND), diamondoids (e.g., lonsdalite and adamantine), sintered diamonds, and amorphous diamond. In some embodiments, the diamond used in the diamond layer of the radiation shield 104 is of artificial or natural in origin or both, such as artificial diamond grown over a natural diamond. In some embodiments, the diamond used in the diamond layer of the radiation shield 104 is of diamond-like in nature thus in addition to pure diamonds it also contains variants of diamonds such as diamondoids. Some examples of this include, but are not limited to lonsdaleite and adamantane. In some embodiments, the diamond used in the diamond layer of the radiation shield 104 is PCD or sintered. This can be due to the known phenomenon that diamond with randomized grains are tougher due to the lack of exposure of its weaker crystal plane, where each grain is covering each other's mechanical weak point.

The secondary layer used in the radiation shield 104 can include, but are not limited to, metals, ceramics, semiconductors, polymers, and other materials pertaining to the property to stop radiation. The deposition methods of the secondary layer can include, but are not limited to, PVD, CVD, MBE, ALD, and chemical reactions. Some examples of PVD contains, sputtering, E-beam evaporation, and thermal evaporation.

Additional Definitions

Unless defined otherwise, all terms of art, notations and other technical and scientific terms or terminology used herein are intended to have the same meaning as is commonly understood by one of ordinary skill in the art to which the claimed subject matter pertains. In some cases, terms with commonly understood meanings are defined herein for clarity and/or for ready reference, and the inclusion of such definitions herein should not necessarily be construed to represent a substantial difference over what is generally understood in the art.

Reference to "about" a value or parameter herein includes (and describes) variations that are directed to that value or parameter per se. For example, description referring to "about X" includes description of "X". In addition, reference to phrases "less than", "greater than", "at most", "at least", "less than or equal to", "greater than or equal to", or other similar phrases followed by a string of values or parameters is meant to apply the phrase to each value or parameter in the string of values or parameters. For example, a statement that a layer has a thickness of at least about 5 cm, about 10 cm, or about 15 cm is meant to mean that the layer has a thickness of at least about 5 cm, at least about 10 cm, or at least about 15 cm.

As used herein, the singular forms "a," "an," and "the" are intended to include the plural forms as well, unless the context clearly indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

This application discloses several numerical ranges in the text and figures. The numerical ranges disclosed inherently support any range or value within the disclosed numerical ranges, including the endpoints, even though a precise range limitation is not stated verbatim in the specification because this disclosure can be practiced throughout the disclosed numerical ranges.

The above description is presented to enable a person skilled in the art to make and use the disclosure, and is provided in the context of a particular application and its requirements. Various modifications to the preferred embodiments will be readily apparent to those skilled in the art, and the generic principles defined herein may be applied to other embodiments and applications without departing from the spirit and scope of the disclosure. Thus, this disclosure is not intended to be limited to the embodiments shown, but is to be accorded the widest scope consistent with the principles and features disclosed herein.

What is claimed is:

1. A nuclear power source comprising:

at least one radioisotope;

at least one diamond-based charge generator comprising an ohmic contact layer, a $P^{+}$-type diamond layer on a side of the ohmic contact layer, a P-type diamond layer on a side of the $P^{+}$-type diamond layer opposite the ohmic contact layer, a Schottky contact layer on a side of the P-type diamond layer opposite the $P^{+}$-type diamond layer, an insulator layer on a side of the Schottky contact layer opposite the P-type diamond layer, and an end contact layer on a side of the insulator layer opposite the Schottky contact layer;

at least one electric contact electrically connected to the at least one diamond-based charge generator; and a radiation shield that encompasses the at least one radioisotope, the at least one diamond-based charge generator, and the at least one electric contact, wherein the radiation shield comprises Single-Crystalline Diamond (SCD), Polycrystalline Diamond (PCD), Diamond-Like Carbon (DLC), Nano-Diamonds (ND), diamondoids, sintered diamond, amorphous diamond, or combinations thereof.

2. The nuclear power source of claim 1, wherein the ohmic contact layer comprises Ti, Zr, Hf, TiC, ZrC, HfC, Zr—Ti—C, Hf—Ti—C, Zr—Hf—C, Ti—Hf—C, or Ti—Zr—Hf—C, and the Schottky contact layer comprises Al, Ti, Ni, Au, Ag, Nb, Cu, Cr, or Pt.

3. The nuclear power source of a claim 1, wherein the at least one insulator layer comprises ZnO, CuO, NiO, $AlO_x$, $SiO_2$, $TiO_2$, NiO, $Nb_2O_5$, $Al_2O_3$, NiO/ZnO, $Cr_2Q_3/Al_2O_3$, $HfO_2/TiO_2$, $Al_2O_3/TiO_2$, or $Nb_2O_5/Ta_2O_5$, and the end contact layer comprises Pt, Ni, Pd, Au, Ir, Ta, Ag, Al, Cr, Ti, W, or doped semiconductors.

4. The nuclear power source of claim 1, wherein the at least one radioisotope is at least one radioisotope selected from the group consisting of: P-32, V-48, Cf-253, Cr-51, Md-258, Be-7, Cf-254, Co-56, Sc-46, S-35, Tm-168, Fm-257, Tm-170, Po-210, Ca-45, Au-195, Zn-65, Co-57, V-49, Cf-248, Ru-106, Np-235, Cd-109, Tm-171, Cs-134, Na-22, Fe-55, Rh-101, Co-60, Kr-85, H-3, Cf-250, Nb-93m, Sr-90, Cm-243, Cs-137, Ti-44, U-232, Pu-238, Sm-151, Ni-63, Si-32, Ar-39, Cf-249, Ag-108, Am-241, AmBe, Hg-194, Nb-91, Cf-251, Ho-166m1, Bk-247, Ra-226, Mo-93, Ho-153, Cm-246, C-14, Pu-240, Th-229, Am-243, Cm-244, Cm-245, Cm-250, Nb-94, Pu-239, U-233, U-234, Pu-242, Np-237, U-235, U-236, and U-238.

5. The nuclear power source of claim 1, wherein the P-type diamond layer and the $P^{+}$-type diamond layer each comprise Single-Crystalline Diamond (SCD), Polycrystalline Diamond (PCD), Diamond-Like Carbon (DLC), Nano-Diamonds (ND), diamondoids, sintered diamond, amorphous diamond, or combinations thereof.

6. The nuclear power source of claim 5, wherein the P-type diamond layer and the $P^{+}$-type diamond layer comprises SCD and/or PCD.

7. The nuclear power source of claim 6, wherein the SCD is at least one of Type IIa SCD or Type IIb SCD.

8. The nuclear power source of claim 1, wherein the at least one diamond-based charge generator is on a side of the at least one radioisotope.

9. The nuclear power source of claim 1, comprising a plurality of diamond-based charge generators and a plurality of radioisotopes.

10. The nuclear power source of claim 9, wherein the plurality of diamond-based charge generators and the plurality of radioisotopes are arranged in an alternating sequence.

11. The nuclear power source of claim 9, wherein a first plurality of diamond-based charge generators is stacked on a side of a first radioisotope, a second plurality of diamond-based charge generators is stacked on a side of the first radioisotope opposite the first plurality of diamond-based charge generators, and a second radioisotope is on a side of the stack of second plurality of generators opposite the first radioisotope.

12. The nuclear power source of claim 1, wherein the radiation shield comprises PCD or sintered diamond.

13. The nuclear power source of claim 1, wherein the at least one electrical contact comprises Ag, Cu, Au, Al, W, Zn, Pt, Ti, or Ni.

14. The nuclear power source of claim 1, wherein the diamond-based charge generator comprises radioisotopes embedded in diamond.

15. The nuclear power generator of claim 1, wherein an interface between the P-type diamond layer and the Schottky contact layer comprises a dipole moment possessing functionalization.

16. The nuclear power source of claim 1, wherein the radiation shield comprises a diamond layer and a secondary layer.

17. The nuclear power source of claim 16, wherein the secondary layer is embedded within the diamond layer.

18. The nuclear power source of claim 16, where the secondary layer comprises apertures that are covered by a secondary cap layer.

* * * * *